US012580737B2

(12) United States Patent (10) Patent No.: US 12,580,737 B2

Underwood et al. (45) Date of Patent: Mar. 17, 2026

(54) SCALABLE KEY STATE FOR NETWORK ENCRYPTION

(71) Applicant: HEWLETT PACKARD ENTERPRISE DEVELOPMENT LP, Spring, TX (US)

(72) Inventors: Keith D. Underwood, Spring, TX (US); Duncan Roweth, Bristol (GB); Michael R. Strom, Chippewa Falls, WI (US); Eric Edward Eilertson, Bloomington, MN (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 175 days.

(21) Appl. No.: 18/515,782

(22) Filed: Nov. 21, 2023

(65) Prior Publication Data

US 2024/0250815 A1 Jul. 25, 2024

Related U.S. Application Data

(60) Provisional application No. 63/440,586, filed on Jan. 23, 2023.

(51) Int. Cl.
| | |
|---|---|
| *H04L 9/08* | (2006.01) |
| *H04L 9/32* | (2006.01) |
| *H04L 9/40* | (2022.01) |

(52) U.S. Cl.
CPC .......... *H04L 9/0819* (2013.01); *H04L 9/0825* (2013.01); *H04L 9/0894* (2013.01);
(Continued)

(58) Field of Classification Search
CPC ....... H04L 9/08; H04L 9/0894; H04L 9/0825; H04L 9/0822; H04L 9/0897;
(Continued)

(56) References Cited

U.S. PATENT DOCUMENTS

2012/0216034 A1* 8/2012 Chen ................... H04L 63/0823
713/153
2020/0220713 A1* 7/2020 Li ............................ H04L 9/14
(Continued)

OTHER PUBLICATIONS

Y. Nir, p.com, ChaCha20, Poly1305, and Their Use in the Internet Key Exchange Protocol (IKE) and IPSec, Aug. 1, 2015, pp. 1-13 (Year: 2015).*

(Continued)

*Primary Examiner* — Shaqueal D Wade-Wright

(74) *Attorney, Agent, or Firm* — Dickinson Wright

(57) ABSTRACT

Systems and methods are provided for implementing encryption of data-in-motion and/or otherwise stored data using a key server and a secure enclave of a Network Interface Card (NIC). The NIC acts as a passthrough between the client device and the shared infrastructure of the supercomputer system to help ensure data security in a massively scaled and distributed system. For example, in response to an enrollment process that stores a decrypted key in the secure enclave of a NIC, the NIC can receive a data packet from a client device. The NIC can transmit a key request to a key server that includes an encrypted key corresponding to the decrypted key. The key server can look up the previously stored private/public key pair to authenticate the NIC. The key server can provide private/public key pair to the NIC to allow the NIC to later encrypt data-in-motion.

20 Claims, 8 Drawing Sheets

(52) U.S. Cl.
CPC .......... _H04L 9/0897_ (2013.01); _H04L 9/3263_
(2013.01); _H04L 63/062_ (2013.01); _H04L_
_9/0822_ (2013.01); _H04L 63/0442_ (2013.01)

(58) Field of Classification Search
CPC ......... H04L 9/0819; H04L 9/083; H04L 9/32;
H04L 9/3263; H04L 63/0442; H04L
63/06; H04L 63/062; H04L 63/10
See application file for complete search history.

(56) References Cited

U.S. PATENT DOCUMENTS

| | | | |
|---|---|---|---|
| 2021/0211467 A1* | 7/2021 | Naeimi | ............... H04L 63/0485 |
| 2021/0336781 A1* | 10/2021 | Jia | ............................ H04L 63/04 |
| 2022/0067221 A1* | 3/2022 | Schiattarella | ........... H04L 9/088 |
| 2022/0103530 A1* | 3/2022 | Daly | ..................... H04L 47/781 |
| 2023/0006981 A1* | 1/2023 | Syrivelis | ............. G06F 9/45558 |
| 2023/0111457 A1* | 4/2023 | Dobbins | ............... H04L 9/0643 |
| | | | 713/170 |
| 2024/0297781 A1* | 9/2024 | Venkata | ................ H04L 9/0819 |

OTHER PUBLICATIONS

Google Cloud, "Announcing PSP's cryptographic hardware offload at scale is now open source", available online at <https://cloud. google.com/blog/products/identity-security/announcing-psp-security-protocol-is-now-open-source>, May 20, 2022.

* cited by examiner

100

Key Server
110

Interconnect Fabric
120

NIC
130

Secure Enclave
132

ROT

SCE

Encrypt

Decrypt

Tx

Rx

Client Device
140

Initiate Enrollment Process that Stores Decrypted Key in Secure Enclave of NIC 520

Transmit Key Request to Key Server with Encrypted Key 530

Receive Encrypted Key Material from Key Server 540

Decrypt the Encrypted Key Material using Decrypted Key 550

Store the Key Material at the NIC 560

SCALABLE KEY STATE FOR NETWORK ENCRYPTION

RELATED APPLICATIONS

This application claims the benefit of and priority to U.S. Provisional Patent Application No. 63/440,586, filed on Jan. 23, 2023, the contents of which is incorporated herein by reference in its entirety.

STATEMENT OF GOVERNMENT-FUNDED RESEARCH

This invention was made with Government support under Contract Number H98230-23-C-0350 awarded by the Maryland Procurement Office. The Government has certain rights in this invention.

BACKGROUND

Ensuring data privacy is an increasingly important element of supercomputing. Sensitive data, including healthcare patient data, data labeled as "Top Secret," and other types of sensitive data, are transmitted and stored throughout these supercomputer systems. In traditional systems, the data may be accessed by system administrators of the supercomputer system. When the supercomputer is used to host multiple applications and users, the administrative users of the shared infrastructure could theoretically access other user's systems. However, users should be confident that other users and the system administrators cannot access their data.

BRIEF DESCRIPTION OF THE DRAWINGS

The present disclosure, in accordance with one or more various examples, is described in detail with reference to the following figures. The figures are provided for purposes of illustration is to merely depict typical or examples.

Figure 1:
FIG. 1 is an illustrative distributed computer system that implements a scalable key state for network encryption, in accordance with some examples of the disclosure.

The figures are not exhaustive and do not limit the present disclosure to the precise form disclosed.

DETAILED DESCRIPTION

Providing strong guarantees as to authenticity and privacy can enhance the value and use of the supercomputer system.

Some traditional systems, like Cloud Service Providers (CSPs), implement encryption ubiquitously. However, this still allows administrative users to access multiple systems when the encryption is removed. Scalable computing solutions within an interconnect fabric or other shared infrastructure are described throughout the disclosure to better implement ubiquitous encryption in these systems.

Examples of the technology described herein implement encryption of data-in-motion and/or otherwise stored data using a key server and a secure enclave of a Network Interface Card (NIC). The secure enclave of the NIC may store a Unique Device Secret (UDS) that can act as an immutable fingerprint confirming the identity of the NIC. The UDS may not be transmitted outside of the NIC's secure enclave and instead be used to generate a public key. The public key associated with the UDS can be added to a key request and, when the key request is received by the key server, the key server can look up the previously stored private/public key pair that can be provided to the authenticated NIC. Once authenticated, the key server can provide private/public key pair to the NIC to allow the NIC to later encrypt data-in-motion. The NIC can act as a passthrough between the client device and the shared infrastructure of the supercomputer system, referred to as the interconnect fabric.

The encryption of data-in-motion refers to encryption of data that are transmitted as data packets throughout the interconnect fabric, from a first device to a second device, rather than implementing encryption as the data is statically stored at a particular device, sometimes referred to as data-at-rest. The data-in-motion may be parsed and transmitted as data packets to the second device, such that a plurality of the data packets are encrypted as it is transmitted (e.g., in motion). The encryption of data-at-rest, comparatively, refers to implementing the encryption of the data before or after transmitting the data, so that the data are encrypted as it is statically stored at the particular device. The data packets transmitted while the data is in motion may be aggregated to form the data-at-rest. The aggregated data may be stored in the particular device rather than storing parsed data separately (e.g., corresponding with a plurality of the data packets in motion). In some examples, the data-at-rest and the data-in-motion may refer to mirror images of the same data, yet converted to different formats for transmission/storage purposes.

Data-in-motion and data-at-rest may be transmitted and encrypted through various methods discussed herein. For example, data-in-motion that is received by the system may be stored in a memory as data-at-rest. In some examples, the data-at-rest may be accessed for encrypting (e.g., using an AES-XTS encryption accelerator), encrypted, then returned to memory in its encrypted format. The encrypted data may be transmitted as data-in-motion and processed through an additional encryption process.

The encryption of the data-in-motion and the data-at-rest may be implemented differently from each other, while various methods may rely on the key server and a Unique Device Secret (UDS) stored in a secure enclave of the NIC to improve authenticity and privacy in the system. For example, data-in-motion may be transmitted from the first/client device. As discussed herein, the UDS may not be transmitted outside of the NIC's secure enclave. Other devices or users may not have access to view the UDS as well. The UDS may be provided to a silicon-level process (e.g., Caliptra or DICE) with other information to form composite certificates and private/public key pairs. These composite certificates and private/public key pairs can be used to establish secure communication with the key server.

Once the secure communication channel is established, the NIC may request an encrypted key from the key server. The encrypted key may be transmitted from the key server to the NIC. The NIC may decrypt the key and subsequently use the key to encrypt the data packets. The encrypted data packet using the key from the key server may be transmitted to a target NIC. Once the target NIC receives the data packet, it may analyze the data packet to select the key (that it received from the key server) to decrypt the data packet.

In some examples, the analysis may be performed by a Root-of-Trust (RoT) in the target NIC, which integrates security functionality directly into the hardware level of the device. In some cases, the ROT implements the security functionality by making an immutable fingerprint (e.g., the NIC's own UDS) in the silicon of the NIC that provides advanced levels of authentication and protection (e.g., against firmware attacks). Using this functionality, the firmware in the RoT in the NIC may initiate an HTTPS connection to fetch the key from the key server, allowing the ROT to retrieve the encrypted key to add to the data packet without transmitting the UDS and improving the authentication process of the NIC.

Upon receiving the request to fetch the key from the NIC, the key server may generate a new key or recover an existing encrypted key from its own storage and decrypt it. Various methods may be implemented to generate the new key. In one example, the key server generates a random key. This random key generation may be a default process for the encryption and decryption of data-in-motion. The key may have a short lifetime for use (e.g., various time ranges, including limitations of a second or a day). This technical feature may limit the access to the data for data-in-motion. For example, when the data are fraudulently captured and a data decryption is attempted, the key may be unretrievable, causing the data to be in accessible. This may help obscure the data from users other than the intended recipient for an extended duration of time. In contrast, data-at-rest may be intended to be decrypted many times over various time frames (e.g., weeks, months, years, etc.).

In either of these implementations, the new key may be requested based on the UDS of the NIC. The received encrypted key from the key server may be used to encrypt new data packets. The key may be returned by the key server to the NIC via the HTTPS connection that was established between the key server and the NIC. The RoT in the NIC may decrypt the new key and store it in a crypt engine of the NIC. Storage key encryption follows a similar path, with the first/client device authenticating themselves and requesting a new key for use with a specific NIC. The new key may be encrypted with the NIC's public key and returned to the first/client device.

Data may be encrypted using the Advanced Encryption Standard's Galois Counter Mode (AES-GCM) algorithm for authenticating and encrypting/decrypting packet data. AES-GCM is a 128-bit block cipher that uses hashing over a binary Galois field to provide authenticated encryption and authenticated decryption. A particular request or service may associate a plurality of applications for the given request or service. The applications may share a key. Replay may be detected using the reliability protocol. Network encryption may have four inputs, including a 256-bit secret key, a 96-bit nonce, the plaintext to be encrypted, and additional data. The 96-bit nonce may comprise, for example, the 32-bit source identifier and a 64-bit unique initialization vector (IV). The format of the nonce may correspond with 96-bits, although other implementations are possible. In some examples, the nonce may be a public source ID that is unique to a plurality of NICs and transmitted with the packet. The output of the encryption may include the encrypted ciphertext and the 128-bit ICV (Integrity Check Value, used for authentication purposes).

Data-at-rest can also be encrypted with a user's key from the key server. The Storage Crypt Engine (SCE) may perform encryption using various methods described herein, including AES-GCM or AES-XTS (e.g., operating on 4K blocks). Storage encryption for AES-GCM is described above, and storage encryption for AES-XTS may have four inputs, including two 256-bit secret keys provided at the start of processing (e.g., one for block encryption of the plaintext and the other for encryption of the "tweak" value), a 128-bit tweak value that is unique for various segments processed for a given key, and the plaintext to be encrypted. The output of the encryption may include the encrypted ciphertext. The length of the encrypted ciphertext may be the same length as the input. For storage applications, the tweak value may be defined as a base value at the start of a file and incremented for subsequent contiguous data units within the file.

Technical improvements are realized throughout the disclosure. For example, the disclosed technology can improve data security of data-at-rest and data-in-motion for a scaled, distributed environment. The data may be transmitted between numerous computing systems of different entities without relying on the protocols and individual data security for those systems, so that data is authenticated and secure along a plurality of the data paths, to enable secure data transmissions upon scaling massive distributed systems. Some implementations of the system may include, for example, crypto shredding corresponding with a limited data retention or GDPR requirements, time-boxed sensitive data access (Classified, HIPAA, Legal, Evidentiary), data segmentation strategies (e.g., Classified, HIPAA, Census, Legal, Evidentiary labels), or implementing a managed "Need to Share" environment where data transmission boundaries are cryptographically enforced.

Technical improvements of the system also enhance scalability to provide technical improvements for large, distributed systems overall. For example, in many existing systems, one key is needed for a pair of clients. This means that a system with 80,000 NICs may maintain 80,000 keys for transmitting and 80,000 keys for receiving. In addition, an NIC may maintain a sequence number with the keys (e.g., 80,000 sequence numbers for transmit and 80,000 for receive). In the disclosed system, one key may be shared among the NICs for encrypting and decrypting all traffic, where the NICs may correspond with a unique UDS that is embedded with the NIC during the manufacturing process and not transmitted external to the NIC. This key sharing may be implemented by generating the packet using a single key (e.g., Key A) and a unique nonce. The NIC may also implement a counter of all generated packets. In some examples, the packets generated by the NIC use the single key with a nonce attached to it (e.g., consisting of a source identifier and the counter value). This may help ensure that every packet that the NIC sends to the network for that key has a unique nonce value and further improve data security. The value generated by the counter may be replaced with a timestamp, in some examples, without loss of generality as long as the timestamp is guaranteed to be unique for every packet generated by that NIC.

FIG. 1 is an illustrative distributed computer system that implements a scalable key state for network encryption, in accordance with some examples of the disclosure. In example 100, key server 110, interconnect fabric 120, NIC

130, and client device 140 are illustrated. One or more NICs 130 and client devices 140 may be implemented with the distributed computer system without diverting from the disclosure.

Key server 110 is configured to generate and transmit keys via interconnect fabric 120. The keys that result from such a process are used by NIC 130 to encrypt transmitted data packets that can originate with client device 140. Different data packets generated on the same NIC 130 may be encrypted with different keys to enforce access control and different privilege levels.

The keys may be transmitted via an HTTPS channel between key server 110 and NIC 130. In a later stage, authorized client device 140 obtains the group keys through key server 110 using DTLS. In this example, Datagram Transport Layer Security (DTLS) corresponds with a type of mutual authentication and key exchange to establish a secure connection. During DTLS, the two devices in the connection (e.g., client device 140 and key server 110) authenticate each other using the TLS protocol. The mutual authentication may be performed by the devices at the same time.

Key server 110 is also configured to generate a new key or recover an encrypted from its own storage and decrypt it. Key server 110 can then encrypt the key using the public key of NIC 130 and transmit the key to NIC 130, so that NIC 130 can decrypt the key using its own private key.

As described herein, encryption in this system may take various forms. For example, for some data-in-motion, the encryption may use the AES-GCM algorithm for authenticating and encrypting/decrypting packet data. GCM is a 128-bit block cipher that uses hashing over a binary Galois field to provide authenticated encryption and authenticated decryption. The application processes that make up a given job (or using a service) share a key. Replay is detected using the reliability protocol. Network encryption has four inputs: a 256-bit secret key, a 96-bit nonce, the plaintext to be encrypted, and additional data. The 96-bit nonce may comprise, for example, the 32-bit source identifier and a 64-bit unique IV. The output of the encryption may include the encrypted ciphertext and the 128-bit ICV.

Interconnect fabric 120 may comprise a networking switch or head unit where computing components are attached, including key server 110 and each NIC 130. Access to networks and storage is then provided through interconnect fabric 120.

NIC 130 comprises secure enclave 132 and is configured to act as a passthrough between client device 140 and the shared infrastructure of the distributed computer system, which includes other NICs and key server 110.

Secure enclave 132 may comprise the ROT, fuse block, decrypt and encrypt engines (e.g., for network traffic encryption), and corresponding memories. UDS and some keys may be kept internally and not available outside of secure enclave 132 and client device 140 may not have access to them. The fuse block may contain the UDS of NIC 130 and a secure mode bit. In some examples, ROT may adhere to an open source specification, like Caliptra®, or implement a Physically Unclonable Function (PUF)-based RoT. In these examples, the functionality of the ROT may further protect the identifier from being physically inspected as it is stored in secure enclave 132.

In some examples, secure enclave 132 may come out of reset mode in a secure mode. The secure mode may disable test and scan access. The secure mode can be disabled until manufacturing scan/test is complete, the UDS has been programmed and stored in secure enclave 132, and the secure mode bit has been burned on NIC 130. Secure enclave 132 may then be in secure mode forever after.

Once the UDS is stored and not transmitted, the UDS may be used to generate a public key during an enrollment process. The public key associated with the UDS can be added to a key request and, when the key request is received by the key server, the key server can look up the previously stored private/public key pair that can be provided to the authenticated NIC. For example, (a) the public key/certificate for the of the key server may be distributed during installation and (b) the public keys for each NIC may be installed in key server 110.

In some examples, NIC 130 uses connectionless protocols. Network encryption may be integrated into this model, with the set of processes sharing a Secure Domain Identifier (SDI) that identifies a secret key. Secure distribution of these keys may be implemented. The encryption engines can also perform line rate encryption for point-to-point traffic, e.g., IP traffic between an edge device and a process running within an application. NIC 130 is also configured to receive data-in-motion (e.g., as a stream of data packets) from client device 140 and add an encrypted key to the data packet. Additional detail of the data packet format is provided with FIG. 3 and FIG. 4.

NIC 130 is also configured to receive key material from key server 110. Firmware in the RoT in secure enclave 132 of NIC 130 initiates an HTTPS connection to fetch the key material from key server 110. Key server 110 can send an encrypted key to NIC 130 using the public key generated from the UDS of NIC 130. The RoT in NIC 130 can decrypt the key and store it in the appropriate crypt engine.

Storage key encryption (e.g., for data-at-rest) follows a similar path, with client device 140 authenticating themselves and requesting a key for use with a specific NIC, including NIC 130. The key is returned to client device 140, encrypted with the private key of NIC 130.

In some examples, the data-in-motion that is received by the system is stored in a host memory as data-at-rest. The data may be accessed for encrypting (e.g., using an AES-XTS encryption accelerator), encrypted, then returned to memory in its encrypted format. In some examples, the host computer may be sent the encrypted data as data-in-motion. There may not be an extension header for the encryption for data-at-rest.

In some examples, data-at-rest encryption may be accelerated. The data encryption may be implemented for data-at-rest (e.g., AES-XTS) encryption "inline" as part of the network transfer.

In some examples, NIC 130 can retrieve a key for storage encryption from key server 110. Key server 110 can provide a key to NIC 130 in an encrypted form. A similar process for retrieving and providing the key may be implemented for both data-in-motion and data-at-rest encryption.

In some examples, encryption for data-at-rest can also be integrated into the network pipeline. For example, a block of data may be retrieved from host memory and the system may break it into data packets, encrypt the data packets, and perform various actions. The actions may include, for example, storing an encryption state so that the system can retransmit the data packets at a later time or re-encrypt the data packets when they are retransmitted. The actions may also include an update to the "tweak" value (described below) to help allow transmission of any block of data aligned to any position in the file. The block of data may correspond with any size (e.g., within practical limits).

In some examples, encryption keys are referred to using a handle once they are installed at NIC 130. Network encryption handles may be stored within NIC 130 and may be bound to the queue through which a user process or system service submits the commands. Client device 140 may install a key by presenting the encrypted key material supplied by key server 110. The key material may be decrypted by the ROT at NIC 130 and the handle may be returned. DMA commands may be tagged with these handles and may be passed with each packet to the Storage Crypt Engine and the Outbound Crypt Engine. The Inbound Crypt Engine may perform the decryption of network packets by selecting a key and an algorithm using a pre-programmed match on the packet header.

In some examples, key server 110, NIC 130, and client device 140 may have valid certificates issued by a certification authority (not shown).

Figure 2A:
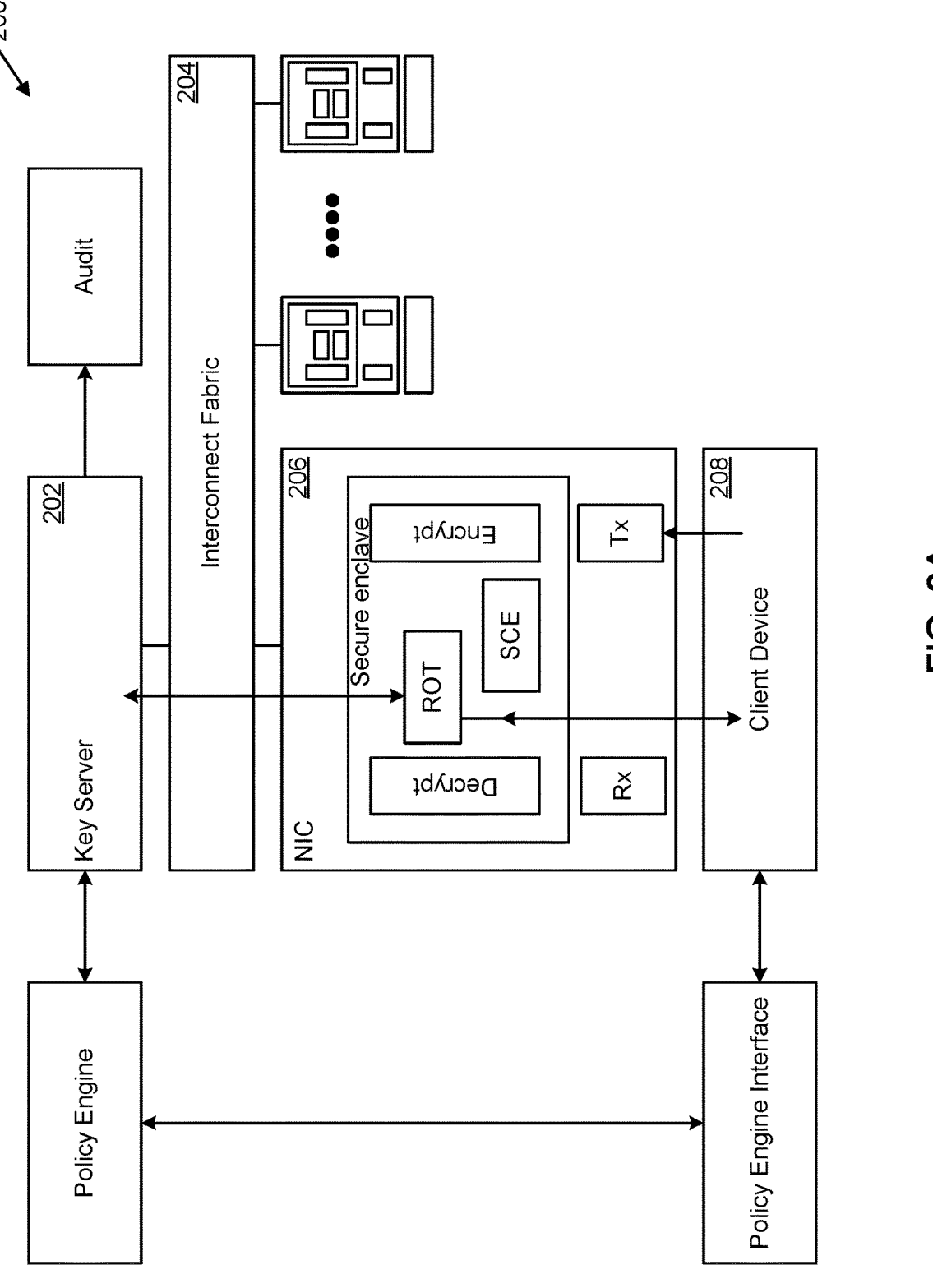
FIGS. 2A and 2B illustrate a key distribution process, in accordance with some examples of the disclosure.
Figure 2B:
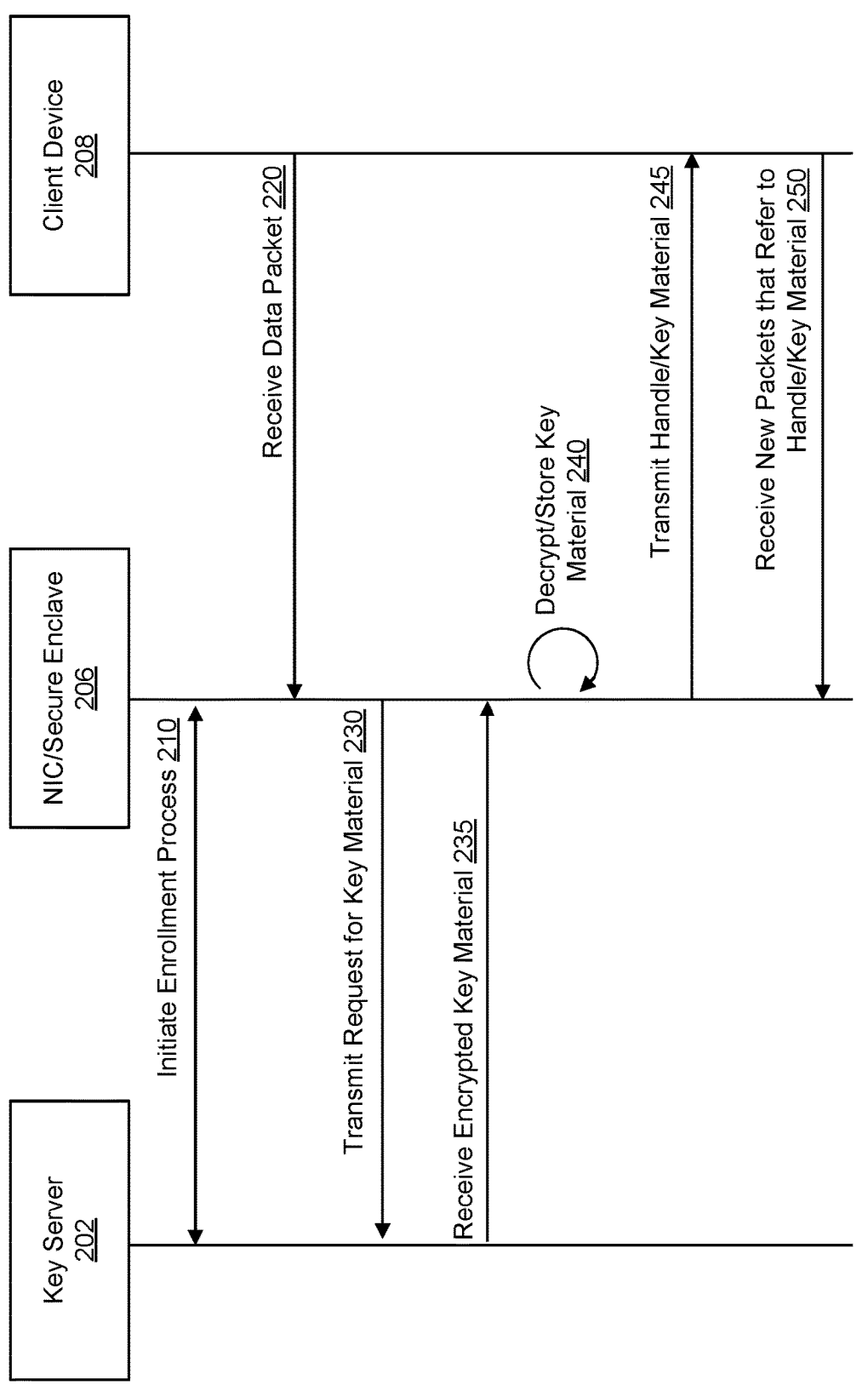

FIGS. 2A and 2B illustrate a key distribution process, in accordance with some examples of the disclosure. Key server 110, interconnect fabric 120, NIC 130, and client device 140 in FIG. 1 may correspond with key server 202, interconnect fabric 204, NIC 206, and client device 208 in FIGS. 2A and 2B. As illustrated in example 200, the UDS is stored in the secure enclave and not transmitted, and the decrypted keys are accessible in the secure enclave of NIC 206 and key server 202, otherwise the keys are encrypted. One or more NICs 206 and client devices 208 may be implemented with the distributed computer system without diverting from the disclosure.

In this example, the secure enclave of NIC 206 may store a UDS that acts as an immutable fingerprint confirming the identity of the NIC and is used to generate a public key. The UDS may be stored at the secure enclave of NIC 206, for example, during the manufacturing of NIC 206. The public key associated with the UDS can be added to a key request during the enrollment process.

At block 210, an enrollment process may be initiated. During the enrollment process, the ROT initiates an HTTPS connection to fetch key material from key server 202. Key server 202 generates a new key or recovers one from its own storage and decrypts it. The key is then encrypted using the requesting NIC's public key and returned via an HTTPS connection. The RoT in NIC 206 decrypts the key and stores it in the appropriate crypt engine. Storage key encryption follows a similar path, with the client device 208 authenticating themselves and requesting a key for use with NIC 206. The key is returned to client device 208, encrypted with the private key of NIC 206.

In some examples, the keys may be encrypted and distributed to the NIC when the client device 208 initiates communications with NIC 206 (e.g., at job startup originating with client device 208). A large job might have 100,000 endpoints (e.g., with client devices 208) where the client device may need a copy. Once a key for the job has been created, the traffic transmitted via the HTTPS connection may be transmitted in parallel to/from the devices (e.g., to distribute the key, etc.).

In some examples, the enrollment process is performed during the manufacturing process to store device information, including a device ID, Unique Device Secret (UDS), or an initial unencrypted key in the secure enclave of NIC 206. This device information may be restricted from being transmitted using the interconnect fabric. The enrollment process may take place in a physically secure environment prior to new equipment being used. If the NIC keys are being burnt on-site, this burning portion of the enrollment process may occur first. The authentication certificate of key server 110 may be distributed to NIC 206. It may be encrypted using the private key of NIC 206 and stored for future use. The public keys of the NIC may be uploaded to key server 202. In some examples, a mutual authentication process (e.g., mutual TLS or mTLS) may be used to validate connections from the ROT of NIC 206 to key server 202.

At block 220, a data packet is received from client computer 208 at NIC 206. For example, in response to the enrollment process, the decrypted key may be stored in a secure enclave of NIC 206. NIC 206 can receive a data packet from client device 208. The data packet may correspond with the data packet format illustrated in FIG. 3 or FIG. 4.

At block 230, a HTTPS connection may be initiated to transmit a key request to key server 202 from NIC 206 to fetch key material from the key server.

At block 235, the key material may be received at NIC 206 from key server 202 that includes the encrypted key material from the key server via the same HTTPS connection.

At block 240, NIC 206 may decrypt the key material from key server 202 using the decrypted key stored in the secure enclave of NIC 206. The decrypted key material may be stored in the secure enclave of NIC 206 and correspond with client device 208. In some examples, the decrypt engine of NIC 206 may decrypt network traffic in a process that is separate from decrypting the key material from key server 202 using the decrypted key stored in the secure enclave of NIC 206.

At block 245, NIC 206 may return handle to client device 208. DMA commands may be tagged with the returned handle and may be passed with the packets from client device 208 to NIC 206 (e.g., the Storage Crypt Engine and the Outbound Crypt Engine).

At block 250, once the encryption keys are installed at NIC 206, client device 208 may refer to them using the handle received from NIC 206. Network encryption handles may be stored within NIC 206 and may be bound to the queue through which a user process or system service submits the commands. The storage key material is received by ROT from key server 202, decrypted, and the resulting key is encrypted and given to client device 208. Client device 208 can install the key by sending ROT the encrypted key it previously received. The ROT can decrypt it and install the unencrypted key in the SCE. Client device 208 may use the unencrypted key via the handle it received during the installation process. The key material may be decrypted by the RoT at NIC 206 and the handle may be returned. DMA commands may be tagged with these handles and may be passed with packets to the Storage Crypt Engine and the Outbound Crypt Engine. The Inbound Crypt Engine may perform the decryption of network packets by selecting a key and an algorithm using a pre-programmed match on the packet header.

Figure 3:
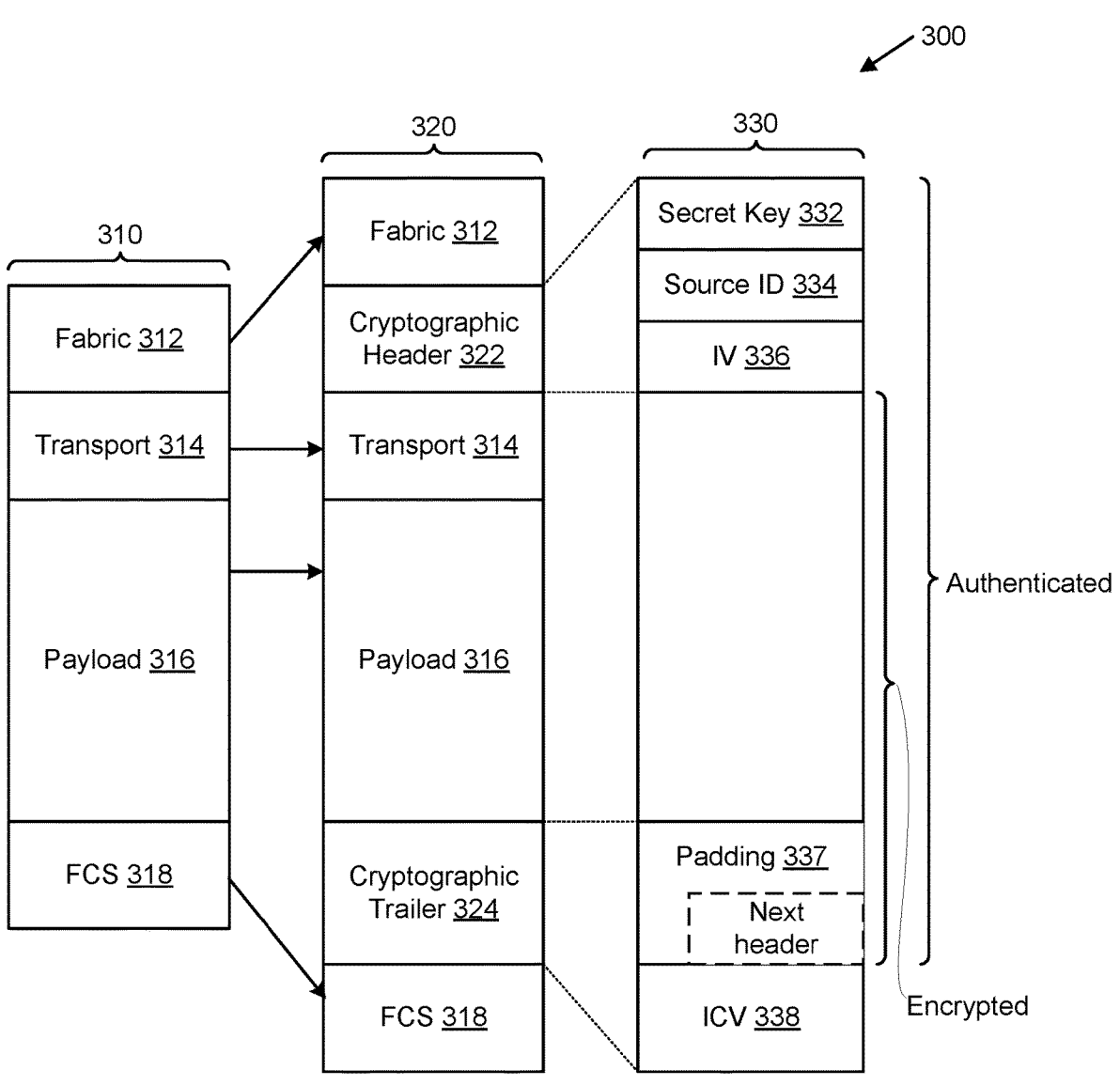
FIG. 3 may correspond with a data packet format for layer three encryption of data traffic (data-in-motion), in accordance with some examples of the disclosure.

FIG. 3 may correspond with a data packet format for layer three encryption of data traffic (data-in-motion), in accordance with some examples of the disclosure. In example 300, the data packet format may be provided. In some examples, the headers and trailers may follow IPsec formats.

At 310, an initial data packet is provided. The data packet may be generated by client device 140 and transferred to NIC 130. The data packet may comprise, for example, fabric identifier 312 (e.g., an ethernet identifier, Internet Protocol (IP) identifier, User Datagram Protocol (UDP) identifier), transport identifier 314, payload information 316, and Flow Cytometry Standard (FCS) identifier 318.

At 320, NIC 130 may add cryptographic data fields to the data packet received from client device 140. The cryptographic data fields may comprise, for example, cryptographic header 322 and cryptographic trailer 324 between various the fields in the original data packet, including fabric identifier 312, transport identifier 314, payload information 316, and FCS identifier 318.

At 330, examples of cryptographic header 322 and cryptographic trailer 324 are provided. For example, the inputs to generate cryptographic header 322 may comprise a 256-bit secret key 332, a 96-bit nonce (comprising source ID 334 and IV 336), the plaintext to be encrypted, and additional data. Secret key 332 may correspond with the SDI protocol that uses a symmetric encryption key, similar to the RADIUS key, in order to encrypt sessions. In some examples, secret key 332 corresponds with the User Datagram Protocol (UDP) 5500. Secret key 332 may be saved in a node secret file and the file may be deployed manually or automatically. The 96-bit nonce may comprise, for example, the 32-bit source identifier 334 and a 64-bit unique initialization vector (IV) 336. Cryptographic trailer 324 may comprise padding 337 and ICV 338.

Additional data may be authenticated, but not encrypted. For example, cryptographic header 332 may be authenticated by not encrypted. The output may include the resulting encrypted ciphertext and the 128-bit ICV 338. The length of the resulting encrypted ciphertext may be the same as the input plaintext. ICV 338 may ensure that the value has not been tampered with.

Corresponding with this format, the authenticated decryption may also be performed. The authenticated decryption may have five inputs, including secret key 332, nonce 334, 336 (e.g., provided at the start of processing), the ciphertext to be decrypted, additional authenticated data, and the authentication tag. Outputs are the decrypted plaintext and a pass/fail indicator signifying whether the authentication passed or failed.

Figure 4:
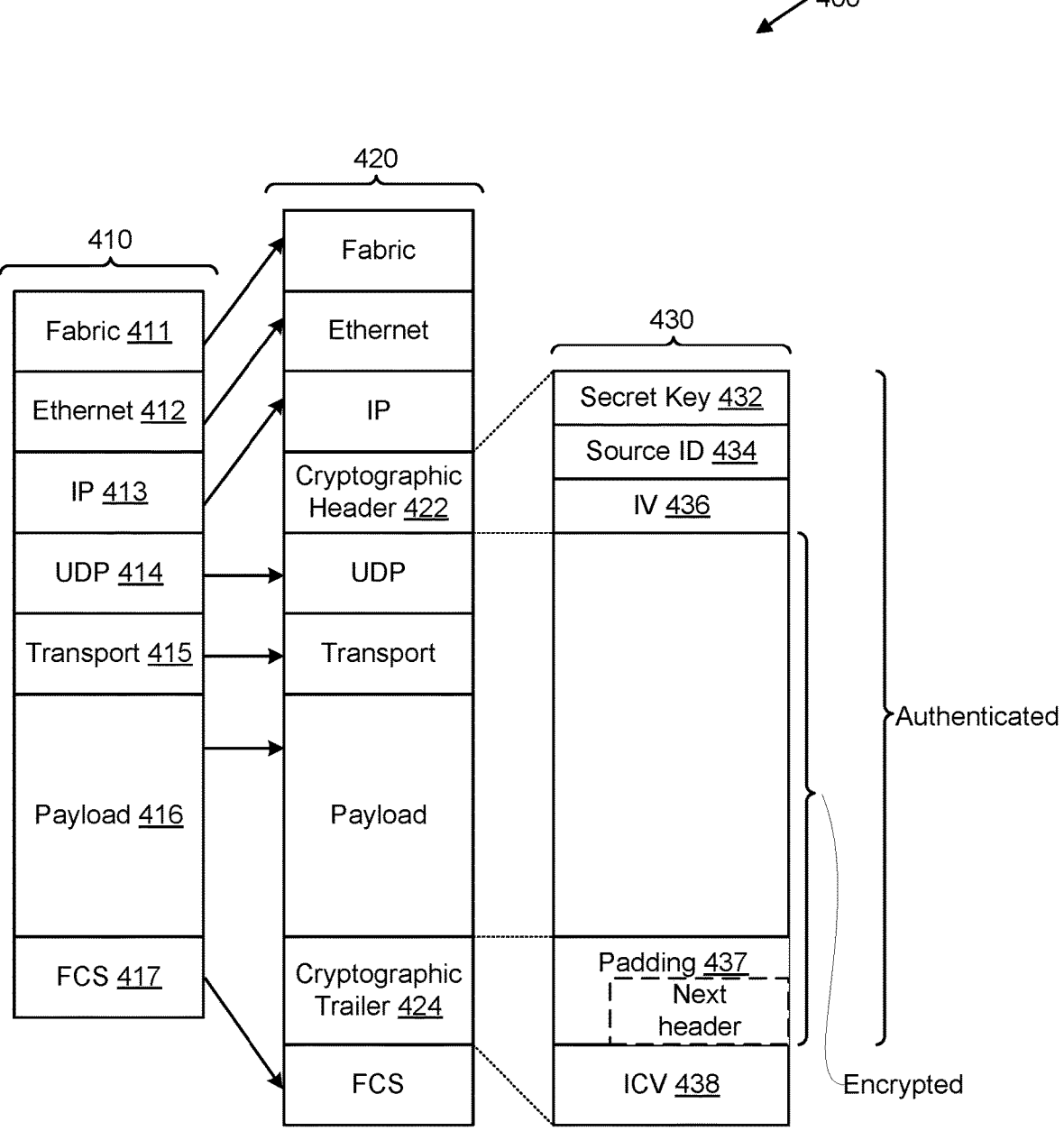
FIG. 4 may correspond with an Internet Protocol (IP) format of the data packet shown in FIG. 3, in accordance with some examples of the disclosure.

FIG. 4 may correspond with an Internet Protocol (IP) format of the data packet shown in FIG. 3, in accordance with some examples of the disclosure. In example 400, the data packet format may be provided. In some examples, the headers and trailers may follow IPsec formats.

At 410, an initial data packet is provided. The data packet may be received from by client device 140 and stored at NIC 130. The data packet may comprise, for example, fabric identifier 411 (e.g., corresponding with interface fabric 120 of FIG. 1), ethernet identifier 412, IP identifier 413, UDP identifier 414, transport identifier 415, payload information 416, and FCS identifier 417.

At 420, NIC 130 may add cryptographic data fields to the data packet. The cryptographic data fields may comprise, for example, cryptographic header 422 and cryptographic trailer 424 between various the fields in the original data packet.

At 430, examples of cryptographic header 422 and cryptographic trailer 424 are provided. Cryptographic header 422 may comprise, for example, secret key 432 (e.g., Secure Domain Identifier (SDI) or other secret key), source identifier 434, and Initialization Vector (IV) 436. Cryptographic trailer 424 may comprise, for example, padding 437 and ICV 438. Source identifier 434 may correspond with a 32-bit source identifier. IV 436 may correspond with a 64-bit unique IV. ICV 438 may correspond with a 128-bit ICV.

Corresponding with this format, the authenticated decryption may also be performed. The authenticated decryption may have five inputs, including a secret key, nonce provided at the start of processing, the ciphertext to be decrypted, additional authenticated data, and the authentication tag. Outputs are the decrypted plaintext and a pass/fail indicator signifying whether the authentication passed or failed.

Various processing and implementation scenarios are possible. For example, encryption and decryption may operate at line rate 800 Gbps. Latency may correspond with 43 cycles at 1.1 GHz on the output path and 47 cycles on the input path. Network encryption may implement a 16-byte header and an 18-21 byte trailer per packet, with an overhead of around 1% on a 4K byte packet (e.g., for DMA traffic).

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 5A:
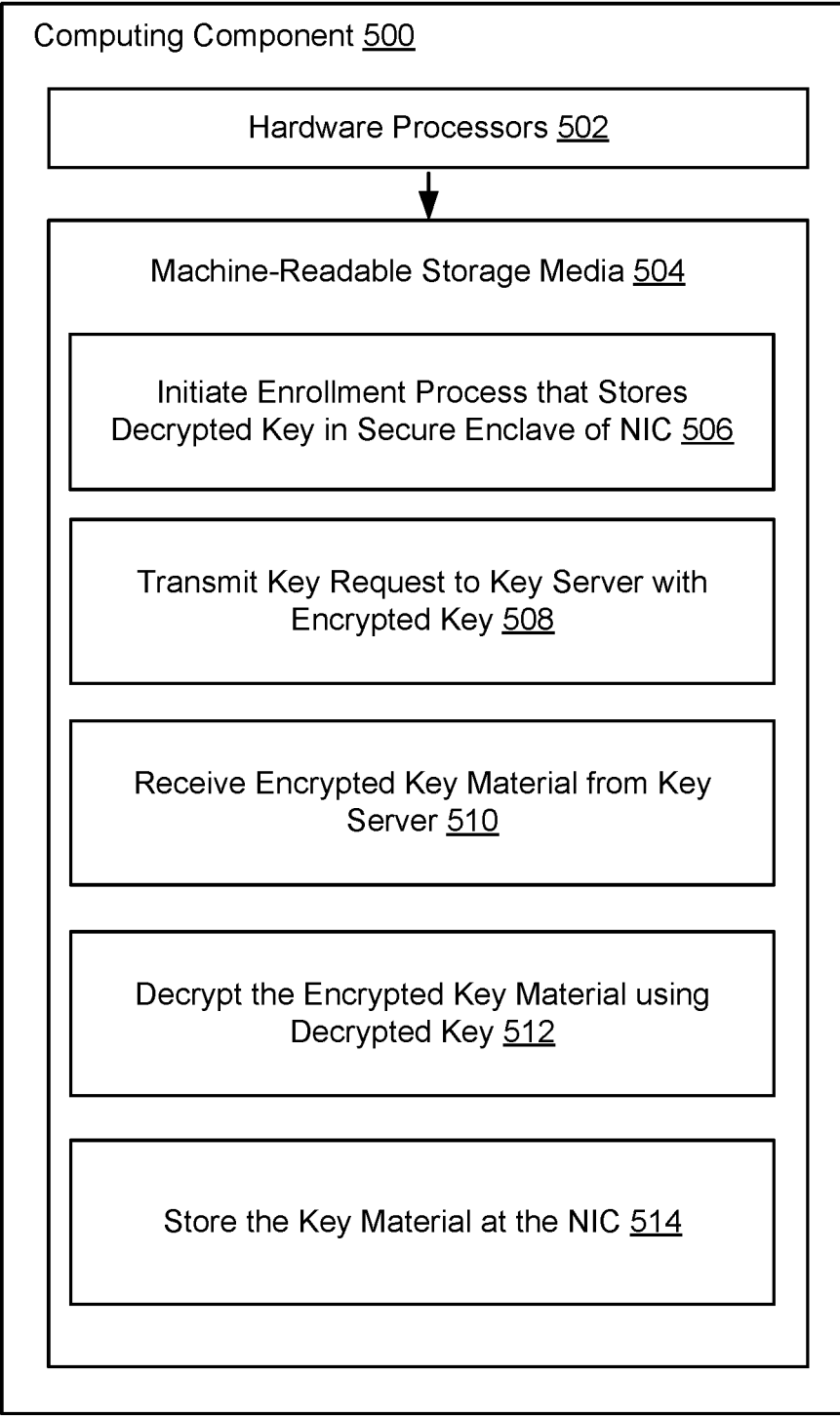
FIG. 5A is an example computing component that may be used to implement various features of examples described in the present disclosure.

FIG. 5A illustrates an example computing component that may be used to implement the scalable key state for network encryption in accordance with various examples. Referring now to FIG. 5A, computing component 500 may be, for example, a server computer, a controller, or any other similar computing component capable of processing data. In the example implementation of FIG. 5, the computing component 500 includes a hardware processor 502, and machine-readable storage medium for 504.

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-514, to control processes or operations for implementing a scalable key state for network encryption. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-514.

Hardware processor 502 may execute instruction 506 to initiate an enrollment process that stores a decrypted key in a secure enclave of a NIC. For example, the enrollment process can include an HTTPS connection initiated by the RoT of the NIC. The HTTPS connection can be used to fetch key material from key server. The key server can generate a new key or recover one from its own storage and decrypt it. The key may be later encrypted using the requesting NIC's public key and returned via the HTTPS connection. The RoT in NIC can decrypt the key and store it in the appropriate crypt engine. In some examples, the keys may be encrypted and distributed to the NIC when a client device initiates communications with NIC (e.g., at job startup originating with client device).

In some examples, the enrollment process is performed during the manufacturing process to store device information. The manufacturing can generate and store a device ID, Unique Device Secret (UDS), or an initial unencrypted key in the secure enclave of NIC. This device information may be restricted from being transmitted using the interconnect fabric.

In response to the enrollment process, the hardware processor 502 may receive a data packet from a client device.

Hardware processor 502 may execute instruction 508 to transmit a key request to a key server. The key request may include an encrypted key corresponding to the decrypted key. The key request may also be transmitted via a HTTPS connection to fetch key material from the key server. In some examples, the HTTPS connection is initiated to transmit the key request to the key server from the NIC. The key request may help to fetch key material from the key server.

Hardware processor 502 may execute instruction 510 to receive the encrypted key material from the key server via the HTTPS connection. For example, the key material may be received from key server that includes the encrypted key material from the key server via the same HTTPS connection.

Hardware processor 502 may execute instruction 512 to decrypt the key material using the decrypted key stored in the secure enclave of the NIC. For example, the NIC may decrypt the key material from key server using the decrypted key stored in the secure enclave of NIC. The decrypted key material may be stored in the secure enclave of NIC. In some examples, the key material may correspond with a client device. In some examples, the decrypt engine of NIC may decrypt network traffic in a process that is separate from decrypting the key material from key server using the decrypted key stored in the secure enclave of NIC.

Hardware processor 502 may execute instruction 514 to store the key material at the NIC for the client device. In some examples, once the encryption keys are installed at NIC, the client device may refer to them using a handle. Network encryption handles may be stored within NIC and may be bound to the queue through which a user process or system service submits the commands. The storage key material is received by ROT from the key server, decrypted, and the resulting key is encrypted and given to client device.

The client device can install the key by sending ROT the encrypted key it previously received. The ROT can decrypt it and install the unencrypted key in the SCE. The client device may use the unencrypted key via the handle it received during the installation process. The key material may be decrypted by the RoT at the NIC and the handle may be returned. In some examples, DMA commands may be tagged with these handles and may be passed with a packet to the Storage Crypt Engine and the Outbound Crypt Engine. The Inbound Crypt Engine may perform the decryption of network packets by selecting a key and an algorithm using a pre-programmed match on the packet header.

Figure 5B:
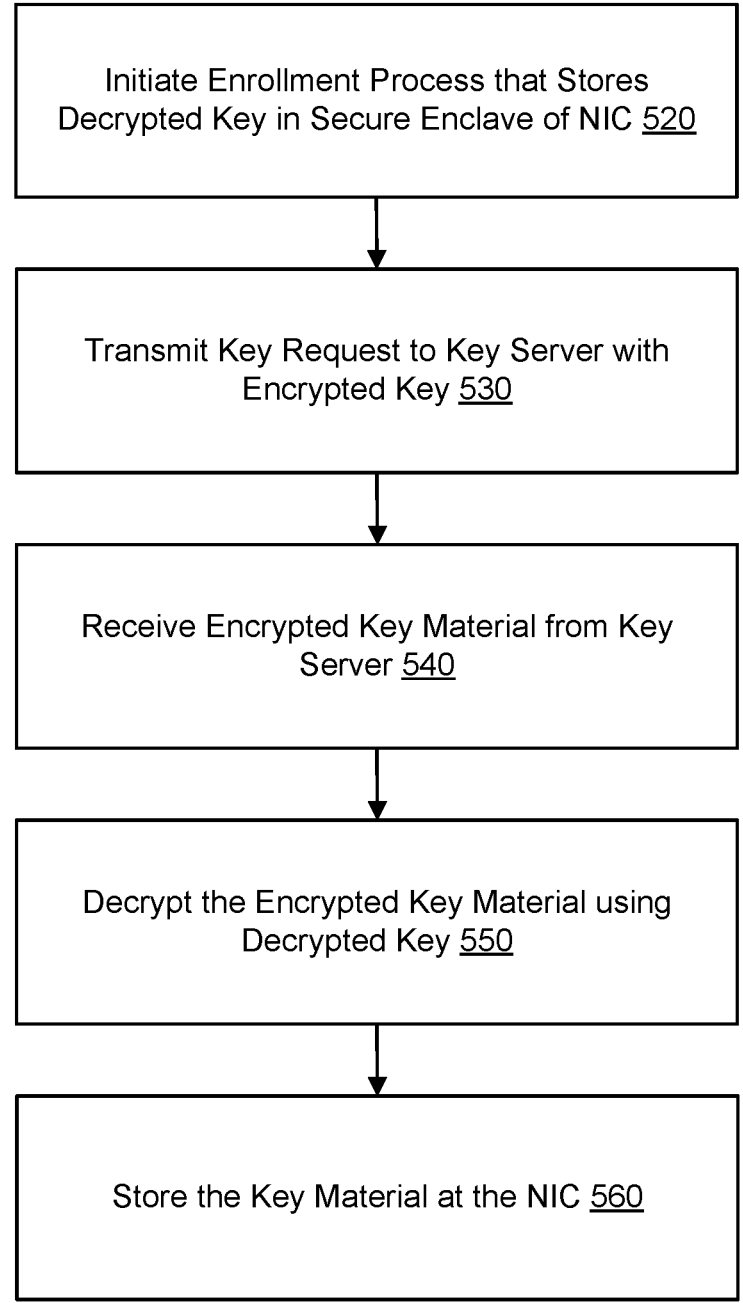
FIG. 5B is an illustrative process performed by the processor illustrated in FIG. 5A by executing machine-readable instructions stored in a memory, in accordance with some examples of the disclosure.

FIG. 5B is an illustrative process performed by the processor illustrated in FIG. 5A by executing machine-readable instructions stored in a memory, in accordance with some examples of the disclosure.

At block 520, an enrollment process may be initiated. The enrollment process may store a decrypted key in a secure enclave of a NIC.

In some examples, the enrollment process can include an HTTPS connection initiated by the RoT of the NIC. The HTTPS connection can be used to fetch key material from key server. The key server can generate a new key or recover one from its own storage and decrypt it. The key may be later encrypted using the requesting NIC's public key and returned via the HTTPS connection. The RoT in NIC can decrypt the key and store it in the appropriate crypt engine. In some examples, the keys may be encrypted and distributed to the NIC when a client device initiates communications with NIC (e.g., at job startup originating with client device).

In some examples, the enrollment process is performed during the manufacturing process to store device information. The manufacturing can generate and store a device ID, Unique Device Secret (UDS), or an initial unencrypted key in the secure enclave of NIC. This device information may be restricted from being transmitted using the interconnect fabric.

At block 530, a key request may be transmitted to a key server. The key request may include an encrypted key corresponding to the decrypted key. The key request may also be transmitted via a HTTPS connection to fetch key material from the key server. In some examples, the HTTPS connection is initiated to transmit the key request to the key server from the NIC. The key request may help to fetch key material from the key server.

At block 540, encrypted key material may be received from the key server via the HTTPS connection. For example, the key material may be received from key server that includes the encrypted key material from the key server via the same HTTPS connection.

At block 550, the key material may be decrypted using the decrypted key stored in the secure enclave of the NIC. For example, the NIC may decrypt the key material from key server using the decrypted key stored in the secure enclave of NIC. The decrypted key material may be stored in the secure enclave of NIC. In some examples, the key material may correspond with a client device. In some examples, the decrypt engine of NIC may decrypt network traffic in a process that is separate from decrypting the key material from key server using the decrypted key stored in the secure enclave of NIC.

At block 560, the key material may be stored at the NIC for the client device. In some examples, once the encryption keys are installed at NIC, the client device may refer to them using a handle. Network encryption handles may be stored within NIC and may be bound to the queue through which a user process or system service submits the commands. The storage key material is received by ROT from the key server, decrypted, and the resulting key is encrypted and given to client device.

In some examples, the client device can install the key by sending ROT the encrypted key it previously received. The ROT can decrypt it and install the unencrypted key in the SCE. The client device may use the unencrypted key via the handle it received during the installation process. The key material may be decrypted by the RoT at the NIC and the handle may be returned. In some examples, DMA commands may be tagged with these handles and may be passed with a packet to the Storage Crypt Engine and the Outbound Crypt Engine. The Inbound Crypt Engine may perform the decryption of network packets by selecting a key and an algorithm using a pre-programmed match on the packet header.

Figure 6:
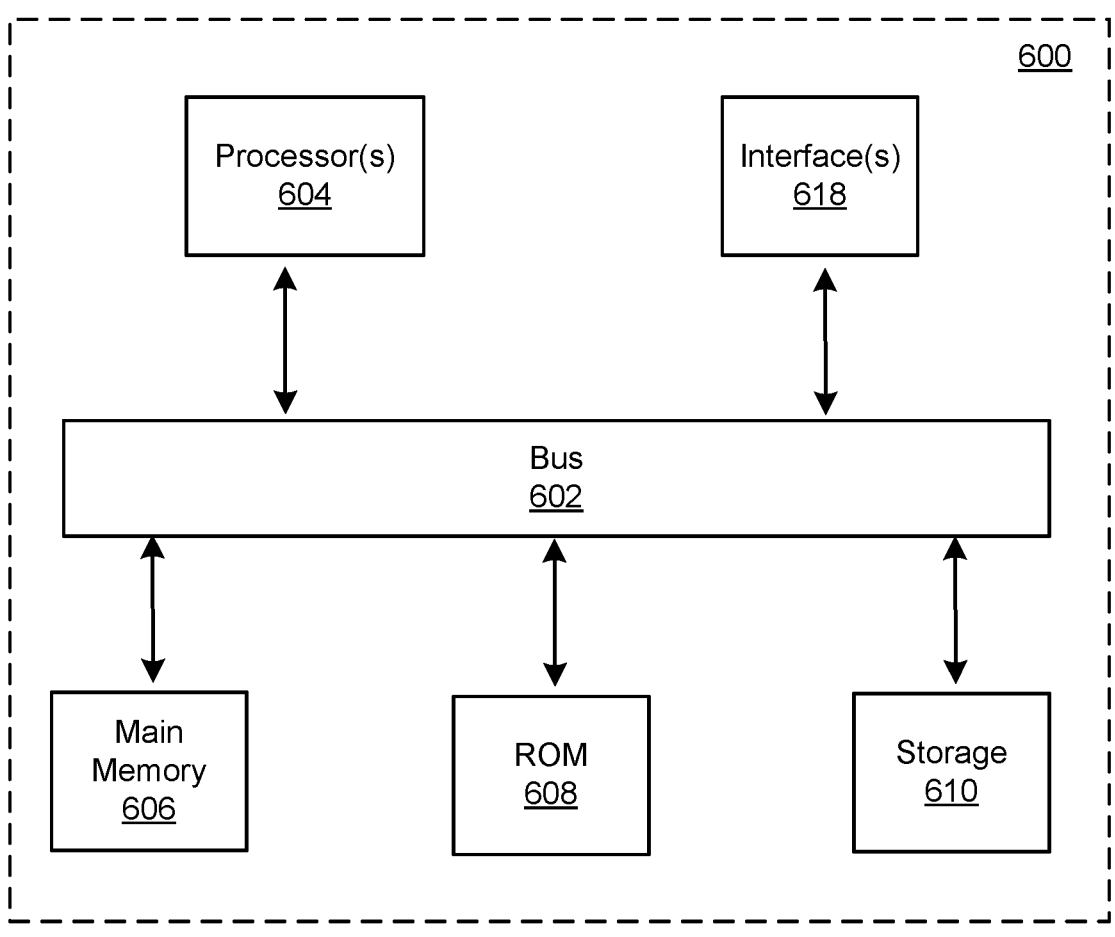
FIG. 6 depicts a block diagram of an example computer system in which various of the examples described herein may be implemented.

FIG. 6 depicts a block diagram of an example computer system 600 in which various of the examples described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. In some examples, main memory may exist separately from the secure enclave of the NIC (e.g., illustrated as secure enclave 132 of NIC 130 illustrated in FIG. 1).

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display, such as a liquid crystal display (LCD) (or touch screen), for displaying information to a computer user. An input device, including alphanumeric and other keys, is coupled to bus 602 for communicating information and command selections to processor 604. Another type of user input device is cursor control, such as a mouse, a trackball, or cursor direction keys for communicating direction information and command selections to processor 604 and for controlling cursor movement on display. In some examples, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one example, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Communication interface 618 provides a two-way data communication coupling to one or more network links that are connected to one or more local networks. For example, communication interface 618 may transmit a key request to the key server and receive the encrypted data packet from the key server via the interconnect fabric illustrated in FIGS. 1 and 2A. In another example, the transmissions between the key server and the NIC may be via the HTTPS connection that was established between the key server and the NIC. The RoT in the NIC may decrypt the new key and store it in a crypt engine of the NIC (e.g., separate from main memory 606).

In some examples, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

The processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system, comprising:
a network interface controller (NIC);
a processor; and
a memory configured to store instructions that, when executed by the processor, cause the processor to:
store a decrypted key in a secure enclave of the NIC during an enrollment process;
in response to the enrollment process, receive, at the NIC, a data packet from a client device;
transmit a key request to a key server, the key request including an encrypted key corresponding to the decrypted key to fetch key material from the key server, wherein the key server is configured to access the key material corresponding to the encrypted key in the key request, decrypt the key material, and encrypt the key material using a public key of the NIC;
receive the key material from the key server, the key material being encrypted;
decrypt the key material using the decrypted key stored in the secure enclave of the NIC; and
store the key material at the NIC for the client device.

2. The system of claim 1, wherein the transmission of the key request to the key server is transmitted via a Hypertext Transfer Protocol Secure (HTTPS) connection and the key material is received from the key server via the HTTPS connection.

3. The system of claim 1, wherein the enrollment process comprises distributing a public key and an authentication certificate of the key server to the NIC.

4. The system of claim 1, wherein the enrollment process comprises providing a public key for a plurality of NICs to the key server.

5. The system of claim 1, wherein a Root-of-Trust (ROT) in the NIC decrypts the key material and stores the decrypted key in a crypt engine of the NIC.

6. The system of claim 1, wherein the data packet is encrypted using an Advanced Encryption Standard's Galois Counter Mode (AES-GCM) algorithm.

7. The system of claim 1, wherein a nonce for the key material is formed from a 32-bit source identifier and a 64-bit per-source packet number.

8. The system of claim 1, wherein the decrypted key is stored in the secure enclave of the NIC and the key server, or the decrypted key is encrypted.

9. A computer-implemented method comprising:
   storing a decrypted key in a secure enclave of a Network Interface Card (NIC) during an enrollment process;
   in response to the enrollment process, receiving, at the NIC, a data packet from a client device;
   transmitting, by the NIC, a key request to a key server, the key request including an encrypted key corresponding to the decrypted key to fetch key material from the key server, wherein the key server is configured to access the key material corresponding to the encrypted key in the key request, decrypt the key material, and encrypt the key material using a public key of the NIC;
   receiving the key material from the key server, the key material being encrypted;
   decrypting, by the NIC, the key material using the decrypted key stored in the secure enclave of the NIC; and
   storing the key material at the NIC for the client device.

10. The computer-implemented method of claim 9, wherein the enrollment process comprises distributing a public key and an authentication certificate of the key server to the NIC.

11. The computer-implemented method of claim 9, wherein the enrollment process comprises providing a public key for a plurality of NICs to the key server.

12. The computer-implemented method of claim 9, wherein a Root-of-Trust (ROT) in the NIC decrypts the key material and stores the decrypted key in a crypt engine of the NIC.

13. The computer-implemented method of claim 9, wherein the data packet is encrypted using an Advanced Encryption Standard's Galois Counter Mode (AES-GCM) algorithm.

14. The computer-implemented method of claim 9, wherein the decrypted key is stored in the secure enclave of the NIC and the key server, or the decrypted key is encrypted.

15. A non-transitory computer-readable storage medium storing a plurality of instructions executable by one or more processors, the plurality of instructions when executed by the one or more processors cause the one or more processors to:
   storing a decrypted key in a secure enclave of a Network Interface Card (NIC) during an enrollment process;
   in response to the enrollment process, receive a data packet from a client device;
   transmit a key request to a key server, the key request including an encrypted key corresponding to the decrypted key to fetch key material from the key server, wherein the key server is configured to access the key material corresponding to the encrypted key in the key request, decrypt the key material, and encrypt the key material using a public key of the NIC;
   receive the key material from the key server, the key material being encrypted;
   decrypt the key material using the decrypted key stored in the secure enclave of the NIC; and
   store the key material at the NIC for the client device.

16. The non-transitory computer-readable storage medium of claim 15, wherein the enrollment process comprises distributing a public key and an authentication certificate of the key server to the NIC.

17. The non-transitory computer-readable storage medium of claim 15, wherein the enrollment process comprises providing a public key for a plurality of NICs to the key server.

18. The non-transitory computer-readable storage medium of claim 15, wherein a Root-of-Trust (ROT) in the NIC decrypts the key material and stores the decrypted key in a crypt engine of the NIC.

19. The non-transitory computer-readable storage medium of claim 15, wherein the data packet is encrypted using an Advanced Encryption Standard's Galois Counter Mode (AES-GCM) algorithm.

20. The non-transitory computer-readable storage medium of claim 15, wherein the decrypted key is stored in the secure enclave of the NIC and the key server, or the decrypted key is encrypted.

* * * * *